United States Patent [19]

Boxer

[11] Patent Number: 5,731,755
[45] Date of Patent: Mar. 24, 1998

[54] VEHICULAR U-TURN INDICATOR

[76] Inventor: Caryn Boxer, P.O. Box 8095, La Jolla, Calif. 92038

[21] Appl. No.: 697,600

[22] Filed: Aug. 27, 1996

[51] Int. Cl.$^6$ ........................................ B60Q 1/34
[52] U.S. Cl. .................. 340/465; 340/472; 340/475; 340/478
[58] Field of Search ................ 340/463–465, 340/475, 478, 907, 909, 910, 916, 917, 918, 919, 931

[56] References Cited

U.S. PATENT DOCUMENTS

| | | | |
|---|---|---|---|
| 2,453,421 | 11/1948 | Dyer | 340/475 |
| 4,084,339 | 4/1978 | Peltier et al. | 40/560 |
| 4,868,541 | 9/1989 | Sullivan et al. | 340/465 |
| 4,994,786 | 2/1991 | Schaffer | 340/478 |
| 5,003,289 | 3/1991 | Roman | 340/468 |
| 5,086,289 | 2/1992 | Sullivan et al. | 340/475 |
| 5,281,950 | 1/1994 | Le | 340/475 |
| 5,303,492 | 4/1994 | Nishio | 40/582 |
| 5,363,092 | 11/1994 | Starchevich | 340/473 |
| 5,400,019 | 3/1995 | Riscoe, Jr. | 340/908 |
| 5,457,439 | 10/1995 | Kuhn | 340/903 |
| 5,475,386 | 12/1995 | Luoma | 340/908 |
| 5,493,929 | 2/1996 | Fanslow et al. | 340/908 |

FOREIGN PATENT DOCUMENTS

| | | |
|---|---|---|
| 7229097 | 3/1974 | France . |
| 2507981 | 12/1982 | France . |
| 2917193 | 11/1979 | Germany . |
| 63106154 A | 5/1988 | Japan . |
| 7257274 A | 10/1995 | Japan . |
| 2178516 | 2/1987 | United Kingdom . |

*Primary Examiner*—Jeffery Hofsass
*Assistant Examiner*—Daniel J. Wu
*Attorney, Agent, or Firm*—Richard C. Litman

[57] ABSTRACT

A U-turn indicator having a series of sequentially illuminated lights forming the shape of 'U'. The indicator is for vehicles or vehicle travel paths. In combination with a vehicle, a plurality of indicators is used. Preferably, an anterior non-inverted 'U', a posterior inverted 'U', and a side laterally dispositioned 'U'. In combination with vehicle travel paths, an inverted 'U' indicator is used in conjunction with a conventional traffic light or the equivalent. The U-turn indicator is activated by an actuator (a operator accessible switch in a vehicle or a vehicle presence sensor in the path). The control module responds to the actuator and generates a control signal, thus sequentially illuminating the series of lights.

12 Claims, 4 Drawing Sheets

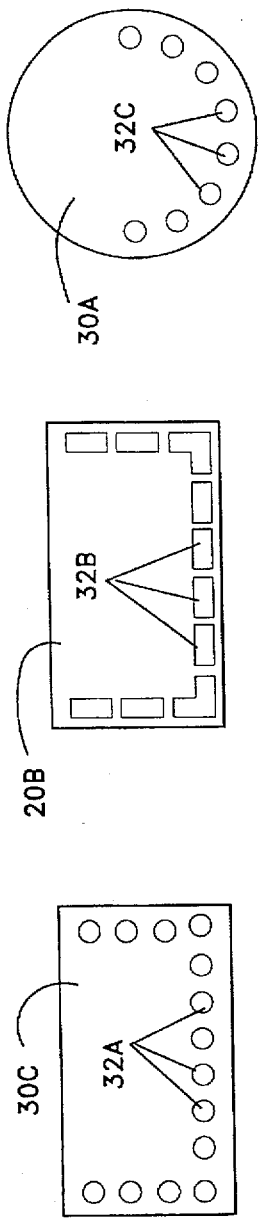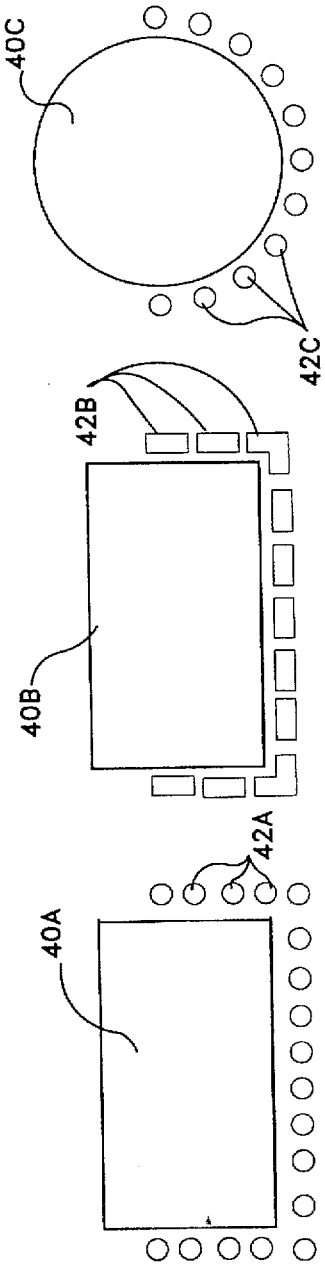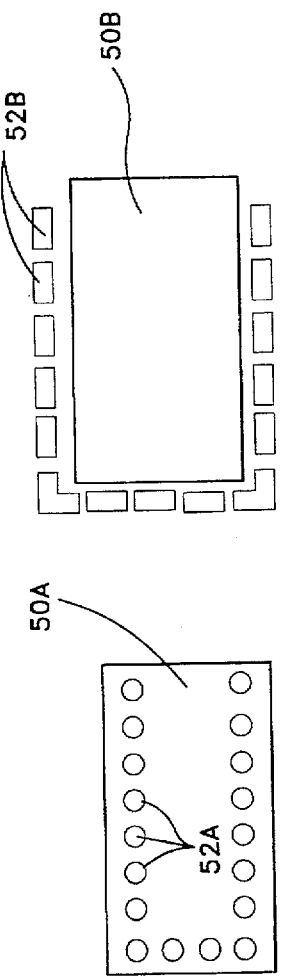

VEHICULAR U-TURN INDICATOR

BACKGROUND OF THE INVENTION

1. Field of the Invention

The present invention relates to vehicular signaling indicators, and more specifically, to indicators for signaling the attempt of U-turn.

2. Description of the Prior Art

While the statistical incidence of U-turns as opposed to left-hand turns in the course of operation of a vehicle is extremely rare, the incidence of accidents while making a U-turn is extremely high. For this reason most local ordinances rigorously control the frequency of U-turns in any stream of traffic. Nonetheless, practicality dictates that some U-turns be permitted, particularly where the travel path arrangement and topography preclude a safer and more convenient change in direction of travel of the vehicle.

Thus, although a U-turn is considered statically dangerous a limited frequency thereof is tolerable due to practical reasoning.

One cause for the large statistical incidence of U-turn collisions is the lack of a perceptive index between an incipient U-turn and a left-hand turn. Typically, a present day vehicle is equipped with turn signals by which an operator of a vehicle advises the approaching and following vehicles or passersby of the forthcoming turn. Such signalling devices, however, do not distinguish between a left-hand turn and a full U-turn. Thus, it is difficult to anticipate that the turning vehicle is embarking on a U-turn rather than a left-hand turn. It is noted that the laws of physical dynamics require a substantially slower speed when executing a U-turn than when executing a simple left-hand turn. Furthermore, controlling the travel path with some sort of sign/signal control system seems to never provide a positive indication when a U-turn is proper or available.

In the past, various devices have been used for signaling a message at the rear of a vehicle. Exemplary teachings of such devices in automobiles are known in the prior art. For example, U.S. Pat. No. 4,868,541, issued Sep. 19, 1989, to Sullivan et al., discloses an all turn signal using a manual ultrasonic sending unit and an ultrasonic receiver and display unit stationed in the rear window of a car, the receiver display unit blocks a fair portion of the rear view mirror field of view of the operator and the ultrasonic system is subject to error due to a multiplicity of acoustical frequencies in a car. U.S. Pat. No. 4,994,786, issued Feb. 19, 1991, to Schaffer, discloses a series of lights in the perimeter of the mid car mounted third brake light, requiring complex wiring and linkage to the turn signal. U.S. Pat. No. 5,003,289, issued Mar. 26, 1991 to Roman, disclose a U-turn signal attachment for cars, having an adjustable bracket. U.S. Pat. No. 5,086,289, issued Feb. 4, 1993, to Sullivan et al., discloses a U-turn signal displayed in the third brake light centrally located in the rear of most newer cars; having an actuator cumbersomely coupled to the standard turn signal shaft and having complex wiring via the steering column. U.S. Pat. No. 5,281,950, issued Jan. 25, 1994, to Le, discloses an add-on U-turn signal device having a control module that enlists the original equipment by recognizing an ON-OFF-ON left-hand turn signal switching sequence, thereby displaying a U-turn lamp located in the rear window of the car. U.S. Pat. No. 5,457,439, issued Oct. 10, 1995, to Kuhn, discloses an automobile travel condition indicator that displays to the driver of the auto if the vehicle is encroaching a zone of inescapable vehicular danger. German patent document no. 2,917,193, published Nov. 15, 1979, and France patent document no. 2,507,981, published Dec. 24, 1982, each disclose basic right-left turn signals for cars.

In addition, conventional traffic or road signs or signals currently in widespread use do not adequately designate when proper or safe to attempt to execute a U-turn. For example, U.S. Pat. No. 4,084,339, issued Apr. 18, 1978, to Peltier et al., discloses a variable roadway sign display using projected images and indicia onto a large screen for improving traffic flow/control. U.S. Pat. No. 5,303,492, issued Apr. 19, 1994, to Nishio, discloses a road sign using materials having highly reflective properties to illuminate legend symbols. U.S. Pat. No. 5,363,092, issued Nov. 8, 1994, to Starchevich, discloses a portable personal sign that allows the user to illuminate alternative "TAXI" or "HELP" signs. U.S. Pat. No. 5,400,019, issued Mar. 21, 1995, to Riscoe, Jr., and U.S. Pat. No. 5,475,386, issued Dec. 12, 1995, to Luoma, each disclose a portable traffic light, however, neither of which indicates allowed U-turns. U.S. Pat. No. 5,493,292, issued Feb. 20, 1996, to Fanslow et al. discloses an automatic "SLOW" or "STOP" changing sign, specifically used in construction areas.

None of the above inventions and patents, taken either singly or in combination, is seen to describe the instant invention as claimed.

SUMMARY OF THE INVENTION

When the operator of a vehicle intends to make a U-turn, it is important that all on-coming (i.e., approaching and following) traffic be advised of such. In addition, it is also necessary to inform cross traffic lane, so that another vehicle while executing the "right on red" privilege will not be found in the immediate collision position with the vehicle making the U-turn. Further, it is important that passersby be aware of the vehicle making the U-turn.

Accordingly, it is a principal object of the invention to provide an indicator for U-turn execution.

It is another object of the invention to provide an indicator for U-turn execution in a vehicular.

It is a further object of the invention to provide an indicator for U-turn execution in vehicle travel path.

Still another object of the invention is to provide a U-turn indicator having a plurality of sequentially illuminating members forming a "U".

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 3A–3C, 4A–4C and 5A–5B are plan views of various indicator arrangements for use on vehicles and signs.

Similar reference characters denote corresponding features consistently throughout the attached drawings.

DETAILED DESCRIPTION OF THE PREFERRED EMBODIMENTS

The present invention provides a clearly visible and identifiable vehicular U-turn indication. The invention is used primarily by vehicles (including but not limited to bicycles, mopeds, motorcycles, automobiles, buses, trucks, trailers, boats, yachts, ships, and the like) for indicating that a safe and proper U-turn is forthcoming. The invention additionally provides vehicles with an indication when safe and proper to make a U-turn or change direction from a respective travel path (including but not limited to roadways, intersections, docks, slips, and the like). Herein, the invention is disclosed in combination with automobiles and intersections; it is noted however, that this is illustrative and does not limit the scope intended by the following claims.

Figure 1:
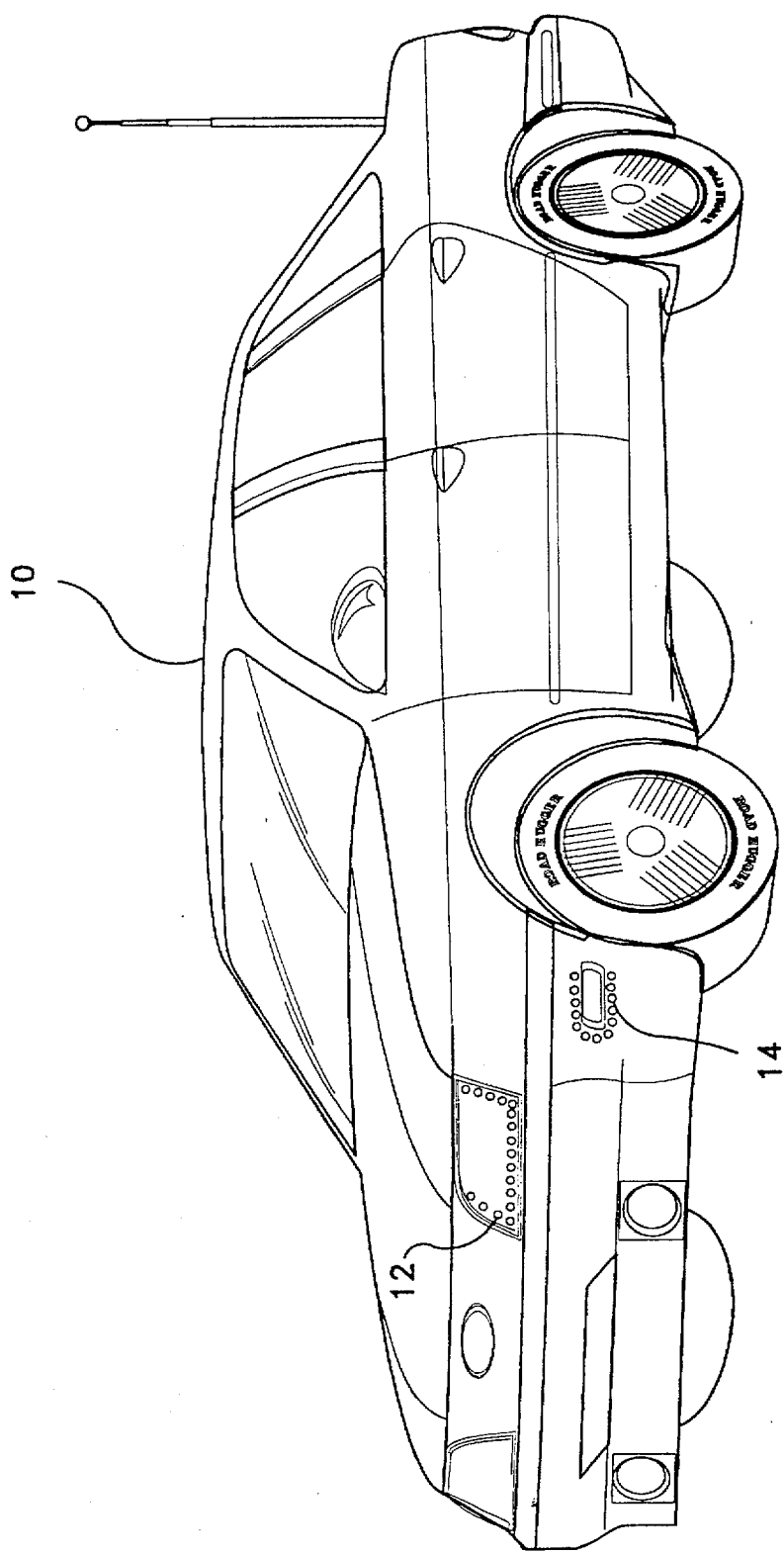
FIG. 1 is a perspective view of a vehicle including the present invention.

Referring to FIG. 1, a vehicle 10 is shown having the U-turn indicator of the present invention. The present invention places a plurality of indicators on the respective vehicle. In this figure, a front or anterior indicator 12 is shown with respect to the left/driver side head light. The anterior indicator 12 is a series of illuminating members, such as lights, LEDs, or the like, that sequentially illuminate forming a non-inverted 'U'. Also, a rear or posterior indicator 16 (see FIG. 2) is associated with the third brake, or the any other centrally located rear light. The posterior indicator 16 also is a series of illuminating members, such as lights, LEDs, or the like, that sequentially illuminate forming an inverted 'U'. In addition, a side indicator 14 is shown with respect to the left/driver side turn signal light. Likewise, the side indicator 14 is a series of illuminating members, such as lights, LEDs, or the like, that sequentially illuminate forming a 'U' having a lateral disposition. The anterior indicator 12 and the side indicator 14 provide a clear indication to the on-coming traffic, the traffic in the crossing lanes, as well as any pedestrians or passersby of the intent of the operator of vehicle 10.

Figure 2:
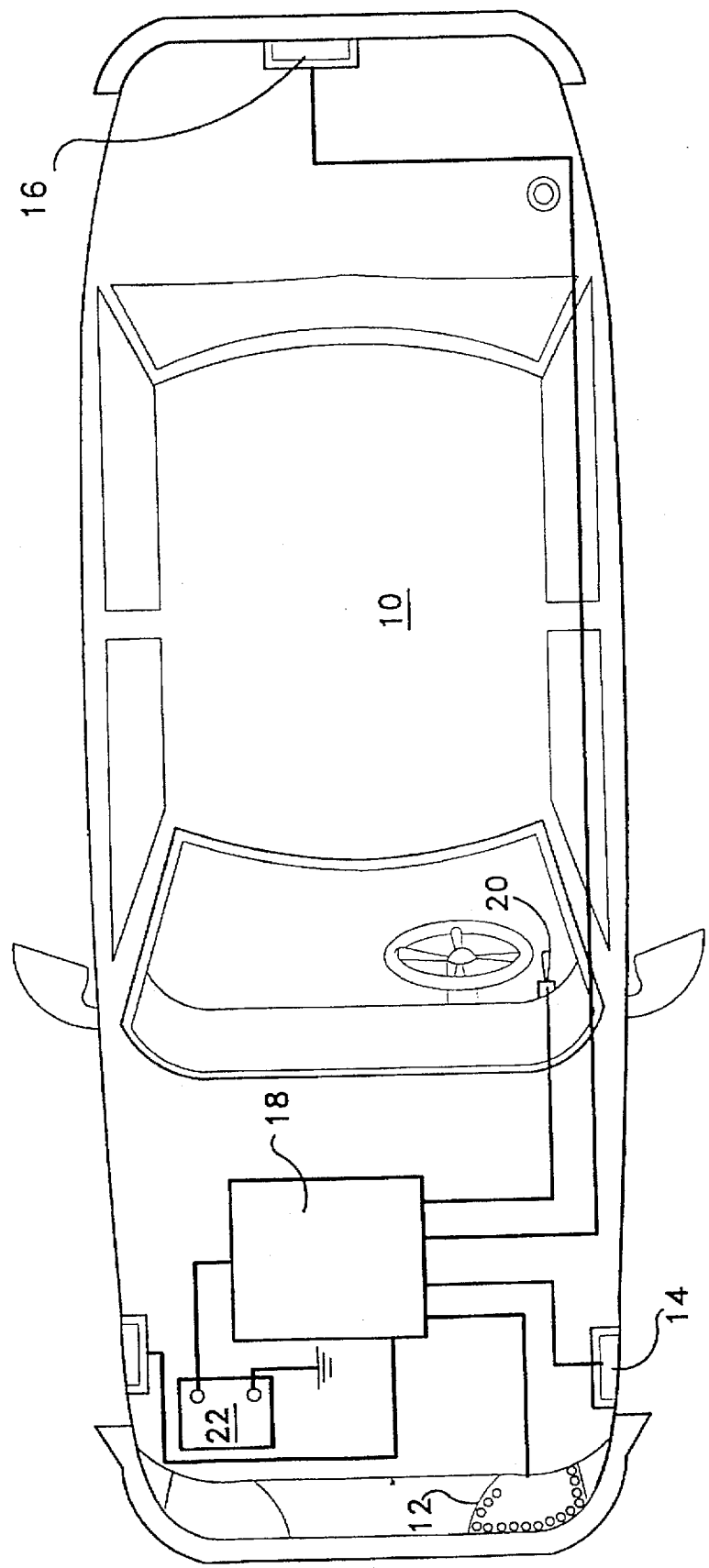
FIG. 2 is an elevational top view of FIG. 1 showing the wiring arrangement of the present invention.

FIG. 2 shows the basic wiring diagram of the invention. The heart of the system is a control module 18. The control modules receives an actuation from an actuator or switch 20. The switch 20 is easily accessible by the operator of the vehicle 10. Preferably, switch 20 is a floorboard mounted foot switch. In this way the operator uses his foot to activate the U-turn indicator. This allows for the vehicle 10 to have one less cumbersome item he needs to manipulate by hand while operating the vehicle 10. Although, a foot switch is preferred, any operator accessible switch 20 is within the scope of the invention. Once the control module 18 receives actuation, a control signal is generated. The generated control signal is then submitted to each of the U-turn indicators 12, 14, and 16.

Figure 6:
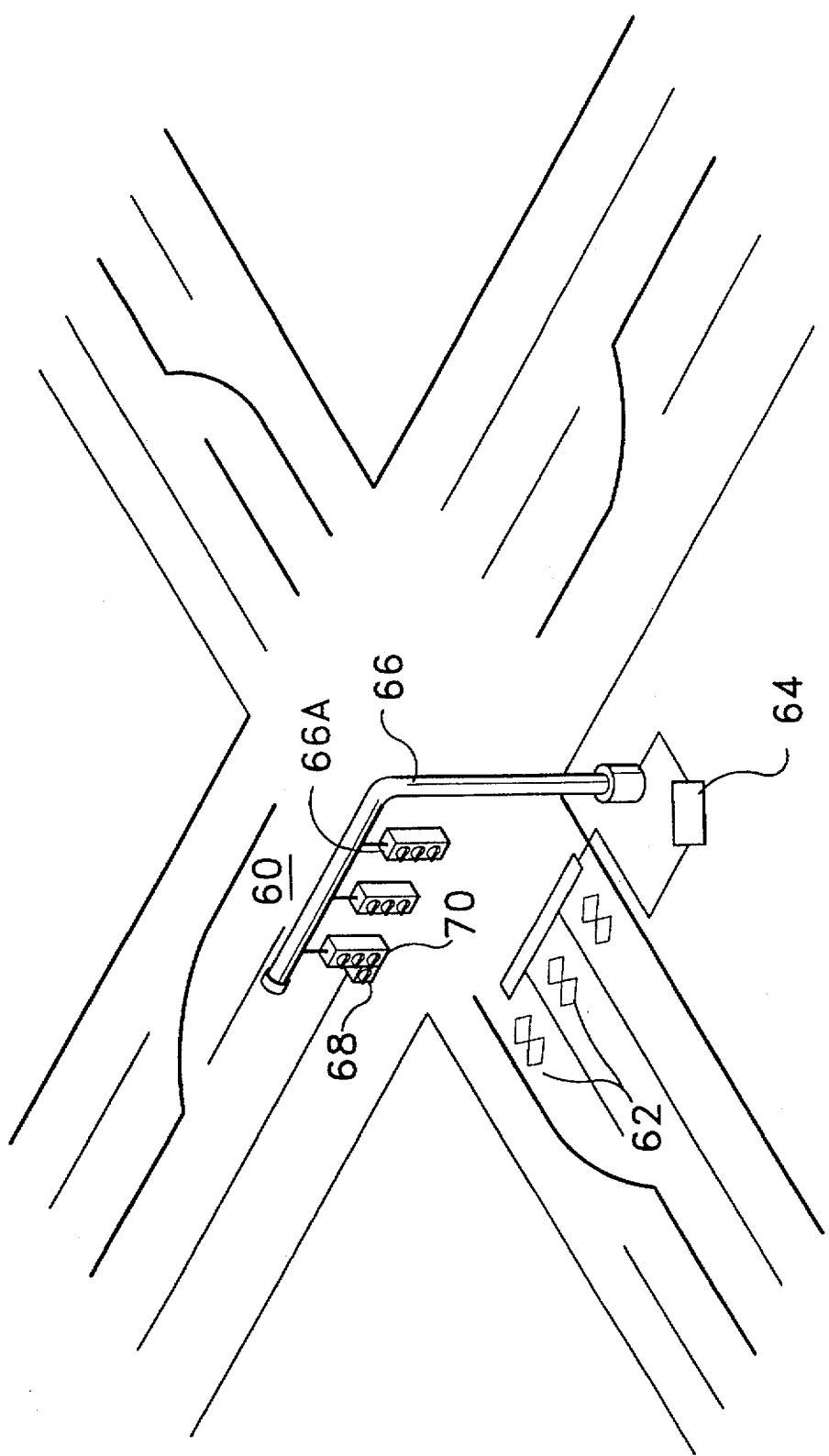
FIG. 6 is an environmental view of the present invention used in a vehicle travel path.

Referring to FIG. 6, a U-turn indicator according to the present invention is shown in combination with the vehicular travel path. Located about intersection 60 are actuators or vehicle sensors 62. When a vehicle 10 is in the vicinity of an actuator 62, a control module 64 responds to the actuators 62, specifically when vehicle 10 is in the left-hand turn lane. The control module 64 generates a control signal for traffic control lights 66A on pole 66. More particularly, the left-hand turn signal light has a conventional left turn indicator 68, and a U-turn indicator 70. The control module 64 accumulates all of the positions of vehicles about the intersection 60 from the actuators 62, and determines whether a U-turn is proper or safe. If the control module determines that a U-turn can be safely completed, indicator 70 will illuminate in accordance with the present invention. It should be appreciated that the scope of the U-turn indicator, shown in FIG. 6 as a permanent intersection structure, is equally effective as a portable unit for servicing temporary and/or urgent travel path alterations. For example, in a areas of road work or road construction, where access is restricted or limited, a portable U-turn indicator can be used in the same fashion as the permanent structure shown in FIG. 6, giving motorists the ability to alter their respective travel direction safely, and with ease. Even for aquatic crafts, the portable U-turn indicator, on a suitable floatation device or pier, can direct aquatic traffic. For example, boat race courses or directing docking maneuvers in low tides, to name a few.

FIGS. 3A, 3B, and 3C illustrate how the series of light members are arranged in one aspect of the invention. FIG. 3A has a rectangular light lens 30A. Internally, of the lens 30A a series of light members 32A each having a circular shape, upon activation by a control signal, light members 32A will illuminate sequentially until the 'U' is formed, turn off and repeat the sequence until the U-turn is completed. Likewise, FIGS. 3B and 3C operate in the same fashion, whereas FIG. 3B, light members are shown as rectangular elements, and FIG. 3C the lens 30C is circular. Also, although not shown, each of FIGS. 3A, 3B, and 3C may be inverted in order to have an inverted U-turn indicator.

FIGS. 4A, 4B, and 4C illustrate how the series of light members are arranged in one aspect of the invention. FIG. 4A has a rectangular light lens 40A. Externally, of the lens 40A there is a series of light members 42A, each having a circular shape. Upon activation by a control signal, light members 42A will illuminate sequentially until the 'U' is formed, then turn off, and then repeat the sequence until the U-turn is completed. Likewise, FIGS. 4B and 4C operate in the same fashion; in FIG. 4B, light members are shown as rectangular elements, and FIG. 4C the lens 40C is circular. Also, although not shown, each of FIGS. 4A, 4B, and 4C may be inverted in order to have an inverted U-turn indicator.

Referring to FIGS. 5A and 5B, the lateral U-turn indicators which are associated with the side turn signals are shown. Specifically, a turn signal lens 50A or 50B is conventionally provided on the side of the vehicle 10. The U-turn indicator of the present invention is positioned as a lateral 'U'. Light members 50A may have a circular shape, or light members 50B may have a rectangular shape. In addition, the light members may also be position internally of the lens 50A or externally of the lens 50B. The specific arrangement is solely at the discretion of the skilled artisan.

It is to be understood that the present invention is not limited to the sole embodiment described above, but encompasses any and all embodiments within the scope of the following claims.

I claim:

1. An indicator for designating a U-turn attempt comprising:

an actuator;

control means responsive to said actuator for generating a control signal; and at least three flashing means, each responsive to said control signal, each of said at least three flashing means having a predetermined disposition, and each of said at least three U-shaped flashing means includes a U-shaped series of illuminating means for sequentially producing a U-shaped lighting effect.

2. The indicator according to claim 1, said actuator comprising a switch.

3. The indicator according to claim 2, said series of illuminating means comprising a series of rectangularly shaped light emitting members.

4. The indicator according to claim 2, said series of illuminating means comprising a series of circularly shaped light emitting members.

5. The indicator according to claim 1, said series of illuminating means comprising a series of rectangularly shaped light emitting members.

6. The indicator according to claim 1, said series of illuminating means comprising a series of circularly shaped light emitting members.

7. In combination with a vehicle, an indicator for designating a U-turn attempt comprising:

actuator means accessible to an operator of the vehicle for actuating the indicator;

control means responsive to said actuator means for generating a control signal; and a plurality of flashing means responsive to said control signal for indicating a U-turn attempt;

said plurality of flashing means including a first, second, and third flasher, each said first, second, and third flasher includes a U-shaped series of illuminating means for sequentially producing a U-shaped lighting effect;

said first U-shaped flasher having a non-inverted disposition, and positioned on the anterior of the vehicle; said second U-shaped flasher having a lateral disposition, and positioned on the side of the vehicle; and said third U-shaped flasher having an inverted disposition, and positioned on the posterior of the vehicle.

8. The indicator according to claim 7, said actuator means comprising a switch.

9. The combination according to claim 8, said series of illuminating means comprising a series of rectangularly shaped light emitting members.

10. The combination according to claim 9, said series of illuminating means comprising a series of circularly shaped light emitting members.

11. The combination according to claim 7, said series of illuminating means comprising a series of rectangularly shaped light emitting members.

12. The combination according to claim 7, said series of illuminating means comprising a series of circularly shaped light emitting members.

* * * * *